(12) United States Patent
Liu et al.

(10) Patent No.: US 12,381,643 B2
(45) Date of Patent: Aug. 5, 2025

(54) RADIO ACCESS NETWORK (RAN)-CENTRIC DATA COLLECTION FOR NEW RADIO (NR)-UNLICENSED (U)

(71) Applicant: QUALCOMM Incorporated, San Diego, CA (US)

(72) Inventors: Huichun Liu, San Diego, CA (US); Gavin Bernard Horn, La Jolla, CA (US); Peng Cheng, Beijing (CN); Ozcan Ozturk, San Diego, CA (US); Xipeng Zhu, San Diego, CA (US)

( * ) Notice: Subject to any disclaimer, the term of this patent is extended or adjusted under 35 U.S.C. 154(b) by 387 days.

(21) Appl. No.: 17/759,596

(22) PCT Filed: Feb. 15, 2020

(86) PCT No.: PCT/CN2020/075445
§ 371 (c)(1),
(2) Date: Jul. 27, 2022

(87) PCT Pub. No.: WO2021/159544
PCT Pub. Date: Aug. 19, 2021

(65) Prior Publication Data
US 2023/0077269 A1    Mar. 9, 2023

(51) Int. Cl.
*H04W 74/0833* (2024.01)
*H04B 17/318* (2015.01)
(Continued)

(52) U.S. Cl.
CPC ...... *H04W 74/0833* (2013.01); *H04B 17/318* (2015.01); *H04W 74/0808* (2013.01); *H04W 76/18* (2018.02)

(58) Field of Classification Search
CPC ............ H04W 74/0833; H04W 76/18; H04W 74/0808; H04W 24/10; H04W 16/14;
(Continued)

(56) References Cited

U.S. PATENT DOCUMENTS

| 2016/0302230 A1 | 10/2016 | Novlan et al. |
| 2019/0124690 A1 | 4/2019 | Siomina et al. |

(Continued)

FOREIGN PATENT DOCUMENTS

| CN | 110100462 A | 8/2019 |
| CN | 110169115 A | 8/2019 |

(Continued)

OTHER PUBLICATIONS

U.S. Appl. No. 62/909,872, filed 2019.*
(Continued)

*Primary Examiner* — Rushil P. Sampat

(57) ABSTRACT

This disclosure provides systems, methods, and apparatus, including computer programs encoded on computer storage media, for wireless communication. In one aspect of the disclosure, a method for wireless communication includes determining, by a user equipment (UE), listen before talk (LBT) information associated with new radio-unlicensed (NR-U) operation of the UE. The method further includes transmitting, by the UE, a report including the LBT information. Other aspects and features are also claimed and described.

35 Claims, 8 Drawing Sheets

(51) Int. Cl.
*H04W 74/0808* (2024.01)
*H04W 76/18* (2018.01)

(58) Field of Classification Search
CPC ..... H04W 24/08; H04W 48/20; H04W 76/15; H04W 76/40; H04B 17/318; H04L 41/0816
See application file for complete search history.

(56) References Cited

U.S. PATENT DOCUMENTS

| | | | |
|---|---|---|---|
| 2019/0342783 A1* | 11/2019 | Kim | H04W 24/08 |
| 2020/0052803 A1 | 2/2020 | Deenoo et al. | |
| 2021/0345405 A1* | 11/2021 | Kim | H04W 74/0808 |
| 2022/0007239 A1* | 1/2022 | Roy | H04W 36/22 |
| 2022/0191932 A1 | 6/2022 | Hong | |
| 2022/0256602 A1 | 8/2022 | Hong | |
| 2022/0346174 A1* | 10/2022 | Wang | H04W 74/0808 |
| 2023/0362987 A1* | 11/2023 | Fakoorian | H04B 7/0404 |

FOREIGN PATENT DOCUMENTS

| | | | |
|---|---|---|---|
| CN | 110430594 A | | 11/2019 |
| CN | 110547029 A | | 12/2019 |
| EP | 3952573 A1 | | 2/2022 |
| WO | WO-2018048642 | | 3/2018 |
| WO | WO-2020033360 A1 | | 2/2020 |
| WO | WO 2020/067667 A1 * | | 4/2020 |
| WO | WO 2020/159733 A1 * | | 8/2020 |

OTHER PUBLICATIONS

Kyocera: "MDT Considerations for NG-RAN", R2-1906657, 3GPP TSG-RAN WG2 #106, 3rd Generation Partnership Project, Mobile Competence Centre, 650, Route Des Lucioles, F-06921 Sophia-Antipolis Cedex, France, vol. RAN WG2, No. Reno, USA, May 13, 2019, XP051730117, pp. 1-4.

Kyocera: "MDT Considerations for NG-RAN", R2-1906657, 3GPP TSG-RAN WG2 #106, 3rd Generation Partnership Project, Mobile Competence Centre, 650, Route Des Lucioles, F-06921 Sophia-Antipolis Cedex, France, vol. RAN WG2, No. Reno, USA, May 13, 2019, XP051730117, pp. 1-4, Proposal 5, p. 4.

Supplementary European Search Report—EP20919104—Search Authority—Munich—Dec. 21, 2023.

Supplementary Partial European Search Report—EP20919104—Search Authority—Munich—Sep. 28, 2023.

Ericsson: "WF on RRM Requirements for NR-U", 3GPP TSG-RAN WG4 Meeting #92-Bis, R4-1912082, Oct. 18, 2019 (Oct. 18, 2019) pp. 1, 18-39, 42 pages.

Ericsson: "WF on RRM Requirements for NR-U", 3GPP TSG-RAN WG4 Meeting #93, R4-1915243, Nov. 22, 2019 (Nov. 22, 2019) pp. 1-26.

International Search Report and Written Opinion—PCT/CN2020/075445—ISA/EPO—Nov. 18, 2020.

Nokia et al., "Considerations on RSSI and CO Measurements", 3GPP TSG-RAN WG2 Meeting #106, R2-1906748, May 17, 2019 (May 17, 2019) sections 1-2, 3 pages.

Vivo: "Remaining Issues of Uplink LBT Failure", 3GPP TSG-RAN WG2 Meeting #107bis, R2-1912177, Oct. 18, 2019 (Oct. 18, 2019) sections 1-2, 4 pages.

Google: "Consistent LBT Failure Detection and Recovery", 3GPP TSG-RAN WG2 Meeting#107, R2-1910688, Prague, Czech Republic, Aug. 26, 2019-Aug. 30, 2019, Aug. 16, 2019, 6 Pages.

Oppo: "Report of Offline-403—Remaining Issues of Consistent UL LBT Failure", 3GPP TSG-RAN WG2 Meeting #108, R2-1916382, Reno, USA, Nov. 18-Nov. 22, 2019, Nov. 23, 2019, pp. 1-11.

\* cited by examiner

RADIO ACCESS NETWORK (RAN)-CENTRIC DATA COLLECTION FOR NEW RADIO (NR)-UNLICENSED (U)

CROSS-REFERENCE TO RELATED APPLICATIONS

This application claims the benefit of International Patent Application No. PCT/CN2020/075445, entitled, "RADIO ACCESS NETWORK (RAN)-CENTRIC DATA COLLECTION FOR NEW RADIO (NR)-UNLICENSED (U)," filed on Feb. 15, 2020, which is expressly incorporated by reference herein in its entirety.

TECHNICAL FIELD

Aspects of the present disclosure relate generally to wireless communication systems, and more particularly, but without limitation, to data collection for new radio (NR)-unlicensed (U).

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications. For example, research and development has helped advance New Radio (NR) technology, which leverages beam management, Bandwidth Part (BWP), RRC_INACTIVE, Multi-Radio Access Technology (RAT) Dual Connectivity (MR-DC), and Dual Connectivity (DC)/Carrier Aggregation (CA). However, incorporating NR technology with conventional technologies presents a variety of challenges and obstacles. To illustrate, challenges exist for incorporating NR technology in a device and improve device performance with respect to the NR technology. As specific, non-limiting examples, incorporation of the NR technology into devices has presented related to battery life, throughput, latency, reliability.

BRIEF SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for wireless communication includes determining, by a user equipment (UE), listen before talk (LBT) information associated with new radio-unlicensed (NR-U) operation of the UE. The method further includes transmitting, by the UE, a report including the LBT information.

In some aspects, the report includes a radio link failure (RLF) report, a random access channel (RACH) report, or a connection establishment failure (CEF) report.

In some aspects, the LBT information includes LBT failure information.

In an additional aspect of the disclosure, an apparatus for wireless communication including means for determining, by a user equipment (UE), listen before talk (LBT) information associated with new radio-unlicensed (NR-U) operation of the UE. The apparatus also includes means for transmitting, by the UE, a report including the LBT information.

In an additional aspect of the disclosure, a non-transitory computer-readable medium having program code recorded thereon. The program code includes code to determine listen before talk (LBT) information associated with new radio-unlicensed (NR-U) operation of the UE, and initiate transmission of a report including the LBT information.

In additional aspect of the disclosure, an apparatus configured for wireless communication is disclosed. The apparatus includes at least one processor, and a memory coupled to the processor. The processor is configured to determine listen before talk (LBT) information associated with new radio-unlicensed (NR-U) operation of the UE, and initiate transmission of a report including the LBT information.

In an additional aspect of the disclosure, an apparatus configured for wireless communication is disclosed. The apparatus includes an interface (e.g., a transmitter, a receiver, etc.) configured for wireless communication and a processor system coupled to the interface. The processor system is configured to determine listen before talk (LBT) information associated with new radio-unlicensed (NR-U) operation of the UE, and initiate transmission of a report including the LBT information.

In an additional aspect of the disclosure, a method for wireless communication includes determining, by a user equipment (UE), received signal strength indicator (RSSI) and channel occupancy information for new radio-unlicensed (NR-U) operation of the UE. The method further includes transmitting, by the UE, a report including the RSSI and channel occupancy information.

In some aspects, the report includes a logged minimization of drive test (MDT) report or an immediate minimization of drive test (MDT) report.

In some aspects, the method further includes receiving, by the UE from a network entity, a configuration message to log the RSSI and channel occupancy information with logged minimization of drive test (MDT) information.

In some aspects, the method further includes receiving, by the UE from a network entity, a configuration message to configure immediate MDT measurements for RSSI and channel occupancy.

In an additional aspect of the disclosure, an apparatus for wireless communication including means for determining, by a user equipment (UE), received signal strength indicator (RSSI) and channel occupancy information for new radio-unlicensed (NR-U) operation of the UE. The apparatus also includes means for transmitting, by the UE, a report including the RSSI and channel occupancy information.

In an additional aspect of the disclosure, a non-transitory computer-readable medium having program code recorded thereon. The program code includes code to determine received signal strength indicator (RSSI) and channel occupancy information for new radio-unlicensed (NR-U) operation of the UE, and initiate transmission of a report including the RSSI and channel occupancy information.

In additional aspect of the disclosure, an apparatus configured for wireless communication is disclosed. The apparatus includes at least one processor, and a memory coupled to the processor. The processor is configured to determine received signal strength indicator (RSSI) and channel occupancy information for new radio-unlicensed (NR-U) operation of the UE, and initiate transmission of a report including the RSSI and channel occupancy information.

In an additional aspect of the disclosure, an apparatus configured for wireless communication is disclosed. The apparatus includes an interface (e.g., a transmitter, a receiver, etc.) configured for wireless communication and a processor system coupled to the interface. The processor system is configured to determine received signal strength indicator (RSSI) and channel occupancy information for new radio-unlicensed (NR-U) operation of the UE, and initiate transmission of a report including the RSSI and channel occupancy information.

In an additional aspect of the disclosure, a method for wireless communication includes transmitting, by a network entity, a configuration message to a user equipment (UE). The method further includes receiving, by the network entity from the UE, a report including received signal strength indicator (RSSI) and channel occupancy information for new radio-unlicensed (NR-U) operation of the UE.

In some aspects, the report includes a logged minimization of drive test (MDT) report or an immediate minimization of drive test (MDT) report.

In some aspects, the configuration message indicates to log the RSSI and channel occupancy information with logged minimization of drive test (MDT) information or to configure immediate MDT measurements for RSSI and channel occupancy.

In some aspects, the method further includes receiving an additional report. For example, the additional report includes listen before talk (LBT) information associated with the NR-U operation of the UE.

In some aspects, the additional report includes a radio link failure (RLF) report, a random access channel (RACH) report, or a connection establishment failure (CEF) report.

In an additional aspect of the disclosure, an apparatus for wireless communication including means for transmitting, by a network entity, a configuration message to a user equipment (UE). The apparatus also includes means for receiving, by the network entity from the UE, a report including received signal strength indicator (RSSI) and channel occupancy information for new radio-unlicensed (NR-U) operation of the UE.

In an additional aspect of the disclosure, a non-transitory computer-readable medium having program code recorded thereon. The program code includes code to initiate transmission of a configuration message to a user equipment (UE), and receiving, from the UE, a report including received signal strength indicator (RSSI) and channel occupancy information for new radio-unlicensed (NR-U) operation of the UE.

In additional aspect of the disclosure, an apparatus configured for wireless communication is disclosed. The apparatus includes at least one processor, and a memory coupled to the processor. The processor is configured to initiate transmission of a configuration message to a user equipment (UE), and receiving, from the UE, a report including received signal strength indicator (RSSI) and channel occupancy information for new radio-unlicensed (NR-U) operation of the UE.

In an additional aspect of the disclosure, an apparatus configured for wireless communication is disclosed. The apparatus includes an interface (e.g., a transmitter, a receiver, etc.) configured for wireless communication and a processor system coupled to the interface. The processor system is configured to initiate transmission of a configuration message to a user equipment (UE), and receiving, from the UE, a report including received signal strength indicator (RSSI) and channel occupancy information for new radio-unlicensed (NR-U) operation of the UE.

Other aspects, features, and implementations will become apparent to those of ordinary skill in the art, upon reviewing the following description of specific, examples in conjunction with the accompanying figures. While features may be discussed relative to certain aspects and figures below, all implementations can include one or more of the advantageous features discussed herein. In other words, while one or more examples may be discussed as having certain advantageous features, one or more of such features may also be used in accordance with the various examples. In similar fashion, while exemplary implementations may be discussed below as device, system, or method implementations the exemplary implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Figure 1:
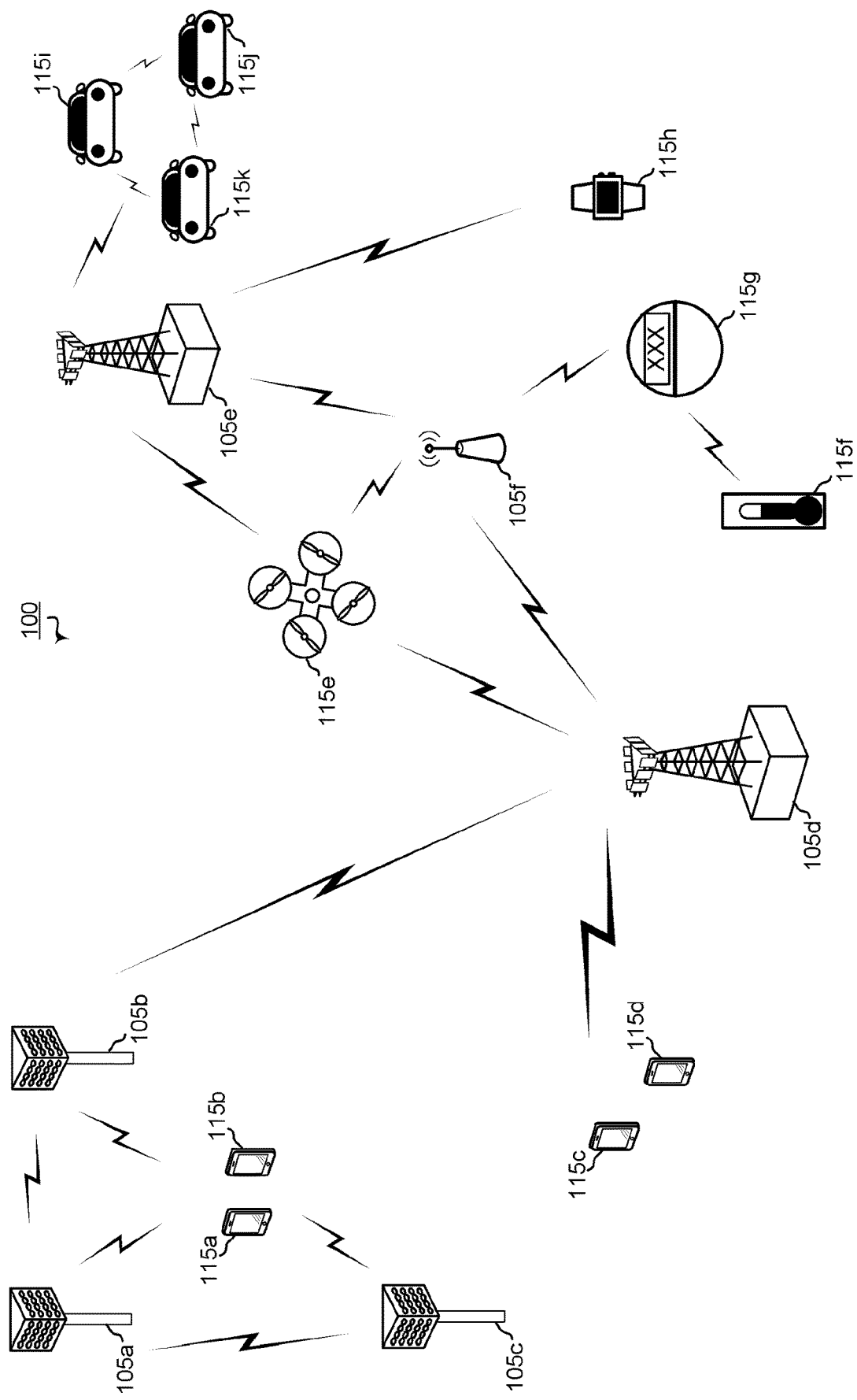
FIG. 1 is a block diagram illustrating details of a wireless communication system according to some aspects.

The Appendix provides further details regarding various aspects of this disclosure and the subject matter therein forms a part of the specification of this application.

DETAILED DESCRIPTION

The detailed description set forth below, in connection with the appended drawings and appendix, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media for radio access network (RAN)-centric data collection for UEs configurable for NR-U operations. The data collection may be used to improve device (e.g., UE) performance, such as battery life, throughput, latency, reliability, and new radio (NR) functionality and/or features, such as beam management, Bandwidth Part (BWP), RRC_INACTIVE, Multi-Radio Access Technology (RAT) Dual Connectivity (MR-DC), and Dual Connectivity (DC)/Carrier Aggregation (CA). The data collection and operational improvement(s) may also lead to reduced operators' capital expenditure (CAPEX) & operating expenditure (OPEX), e.g., by more accurate base station deployment and operation with less human resource intervention. To illustrate, the present disclosure describes collection, storage, reporting, or a combination thereof, of NR-U specific data collection. For example, the present disclosure describes the NR-U specific data collection may be used for or correspond to radio link failure (RLF) report for listen before talk (LBT) failure, random access channel (RACH) report with LBT failure information, connection establishment failure (CEF) report to support RACH failure with LBT failure indication, or a combination thereof. As another example, the present disclosure describes the NR-U specific data collection may be used for or correspond to logged MDT for Received Signal Strength Indicator (RSSI) and Channel Occupancy report. Additionally, the present disclosure also describes the NR-U specific data collection may be used for or correspond to immediate MDT for RSSI and Channel Occupancy report.

In some implementations, a UE may be configured to provide a RLF report for a LBT failure. In NR-U, consistent LBT failures can lead to RLF, at least for uplink (UL) transmissions, for which consistent failures can currently eventually lead to RLF. To support mobility robustness optimization (MRO) for NR-U, user equipment (UE) RLF report for NR-U may be supported in NR. The RLF report of NR-U may include on or more portions of a RLF report for NR. Additionally, or alternatively, the RLF report for NR-U may include LBT information, such as LBT failure related information (e.g, LBT failure information). The LBT information may include a RLF-cause for NR-U (e.g, a missing RLM-RS, consistent LBT failure, etc.), a RLF type (e.g., downlink (DL) or UL LBT failure), a cell identity—Pcell/PSCell/Scell where a LBT failure is detected, a UL transmissions type (e.g., SR, RACH, physical uplink shared channel (PUSCH)), a number of "N" BWPs with UL LBT failure, a BWP ID/frequency for each BWP, an interference type (e.g., a wifi), a channel access schemes for NR-based access for unlicensed spectrum, or a combination thereof. The channel access schemes may include or indicate Category 1: Immediate transmission after a short switching gap, Category 2: LBT without random back-off, Category 3: LBT with random back-off with a contention window of fixed size, or Category 4: LBT with random back-off with a contention window of variable size.

In some implementations, a UE may be configured to provide a RACH report with LBT information (e.g., LBT failure information). In NR-U for RACH procedure, a medium access control (MAC) may return to a resource selection step if LBT fails for Msg1 transmission opportunity(ies). In some implementations, a network may enable automatic RACH parameter settings based on a RACH report received from a UE and by PRACH parameters exchange between gNBs. The RACH report (for NR-U) may include one or more portions of a NR RACH report. Additionally, or alternatively, the RACH report may include LBT information, such as LBT failure information Th LBT information may include or indicate a number of LBT failure detection(s) before each RACH attempt, an indication of resource selection due to LBT failure, or a combination thereof. The RACH report for NR-U can be collected and stored by the UE and reported to NR and vice versa. In some implementations, the RACH report (for NR-U) may include cell ID/tracking area identity (TAI) for each of one or more RACH report entries (to enable access node RACH report retrieval and distribution), an identifier in each of the one or more entries of the RACH report to identify the RACH report for NR-U and the RACH report for NR, an indicator of a channel access scheme for NR-based access for unlicensed spectrum, or a combination thereof. The channel access schemes may include or indicate Category 1: Immediate transmission after a short switching gap, Category 2: LBT without random back-off, Category 3: LBT with random back-off with a contention window of fixed size, or Category 4: LBT with random back-off with a contention window of variable size.

In some implementations, a UE may be configured to provide a connection establishment failure (CEF) report with LBT information, such as a LBT Failure Indication. The CEF report for NR-U may include one or more portions of a NR accessibility report (e.g., a LTE accessibility report). The UE may log failed RRC connection establishments and RRC resume failure for NR. The CEF report may include or indicate a failed cell id, a radio measurement results and neighboring cells, including SSB index of the downlink beams of both serving cell and neighbor cells, tagged with location information, if available. Additionally, in some implementations, the CEF report may include RACH failure information, such as a SSB index, number of sent preambles on each tried SSB and a flag on detected contention. The flag may be per cell, RACH attempt, or SSB. Additionally, or alternatively, the RACH failure information may include the LBT information, such as an LBT failure indication. The failure information may include a RACH failure cause value for a LBT failure, an indication of UL LBT failure or DL LBT failure, a number of consistent LBT failure(s), an interference type (e.g., wifi), a BWP ID/frequency/cell identity where an LBT failure is detected, an indication of a channel access schemes for NR-based access for unlicensed spectrum, or a combination thereof. The channel access schemes may include or indicate Category 1: Immediate transmission after a short switching gap, Category 2: LBT without random back-off, Category 3: LBT with random back-off with a contention window of fixed size, or Category 4: LBT with random back-off with a contention window of variable size.

In some implementations, a UE may be configured for logged MDT for RSSI and Channel Occupancy Report. For example, NR-U may support RSSI and Channel Occupancy configuration and reporting, such as measurements over an interval (at least for CO) and periodical reporting. In some implementations, logged MDT may support logging of RSSI and Channel Occupancy, such as when in an non-active mode, such as RRC_IDLE/RRC_INACTIVE mode. In some implementations, the network may send a logged measurement configuration (e.g., a configuration) to the UE to log RSSI and Channel occupancy in RRC Idle or RRC_INACTIVE mode. The configuration may include or indicate a NR-U frequency list/cell ID list for RSSI and channel occupancy logging, a logging area of NR-U, a logging interval for RSSI and channel Occupancy measurement, or a combination thereof. The UE may report content of logged MDT for NR-U RSSI and channel occupancy report. The report may include or indicate a measurement result of RSSI and channel occupancy, an indicator of a channel occupancy status (e.g., low occupancy, medium occupancy, high occupancy), an occupancy bandwidth, an NR-U frequent/Cell ID, a channel occupancy time, a time stamp, location information, or a combination thereof.

In some implementations, the UE may be configured for immediate MDT for RSSI and channel occupancy report. For example, the RSSI and channel occupancy report may be incorporated in an immediate MDT framework. In some implementations, the network may configure an immediate MDT measurement for RSSI and channel occupancy report. For example, the network may configure an immediate MDT measurement for RSSI and channel occupancy report to an RRC_CONNECTED mode UE for NR unlicensed frequency. The configuration may be based on an RRC measurement procedure for configuration and reporting with location information. The measurement and report of RSSI and channel occupancy include one or more portions of a LTE License Assisted Access (LAA) RSSI and channel occupancy measurement/report. The report may include location information/sensor data (if available).

Thus, the present disclosure describes radio access network (RAN)-centric data collection for UEs configurable for NR-U operations. The data collection may advantageously be used to improve device (e.g., UE) performance, such as battery life, throughput, latency, reliability, new radio (NR) or NR-U functionality and/or features, such as beam management, Bandwidth Part (BWP), RRC_INACTIVE, Multi-Radio Access Technology (RAT) Dual Connectivity (MR-DC), and Dual Connectivity (DC)/Carrier Aggregation (CA). The data collection and operational improvement(s) may also lead to reduced operators' capital expenditure (CAPEX) & operating expenditure (OPEX), e.g., by more accurate base station deployment and operation with less human resource intervention.

This disclosure relates generally to providing or participating in communication as between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as GSM. 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with Universal Terrestrial Radio Access Networks (UTRANs) in the case of a UMTS/GSM network. An operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces, such as those of 5G NR.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations and/or uses may come about via integrated chip implementations and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or OEM devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large/small devices, chip-level components, multi-component systems (e.g. RF-chain, communication interface, processor), distributed arrangements, end-user devices, etc. of varying sizes, shapes, and constitution.

FIG. 1 shows wireless network 100 for communication according to some aspects. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks), and may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In other examples, each base station 105 and UE 115 may be operated by a single network operating entity.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as examples of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the example(s) illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a lightning bolt (e.g., communication link) indicates wireless transmissions between a UE and a serving base station, which is a base station designated to serve the UE on the downlink and/or uplink, or desired transmission between base stations, and backhaul transmissions between base stations. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multi-point (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or stream video, or may include other services for providing community information, such as weather emergencies or alerts, such as Amber alerts or gray alerts.

Wireless network 100 may support mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
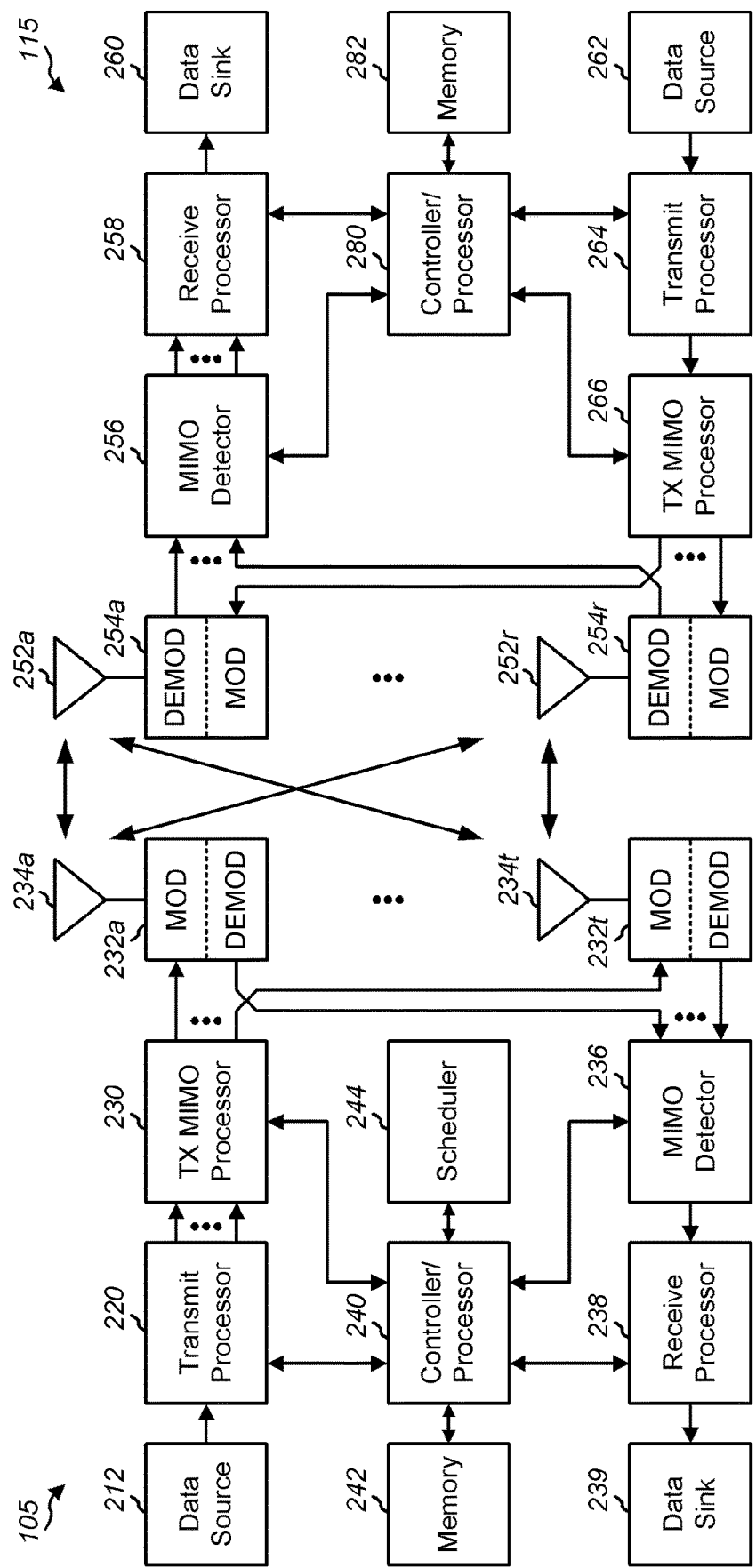
FIG. 2 is a block diagram conceptually illustrating a design of a base station and a user equipment (UE) configured according to some aspects.

FIG. 2 shows a block diagram of a design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115D operating in a service area of base station 105*f*, which in order to access small cell base station 105*f*, would be included in a list of accessible UEs for small cell base station 105*f*. Base station 105 may also be a base station of some other type, or another network entity (e.g., a network, a network core, a network core device, etc.). As shown in FIG. 2, base station 105 may be equipped with antennas 234*a* through 234*t*, and UE 115 may be equipped with antennas 252*a* through 252*r* for facilitating wireless communications.

At the base station 105, a transmit processor 220 may receive data from a data source 212 and control information from a controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the primary synchronization signal (PSS) and secondary synchronization signal (SSS), and cell-specific reference signal. Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232*a* through 232*t*. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232*a* through 232*t* may be transmitted via the antennas 234*a* through 234*t*, respectively.

At the UE 115, the antennas 252*a* through 252*r* may receive the downlink signals from the base station 105 and may provide received signals to the demodulators (DEMODs) 254*a* through 254*r*, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254*a* through 254*r*, perform MIMO detection on the received symbols if applicable, and provide detected symbols. Receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the physical uplink shared channel (PUSCH)) from a data source 262 and control information (e.g., for the physical uplink control channel (PUCCH)) from the controller/processor 280. Transmit processor 264 may also generate reference symbols for a reference signal. The symbols from the transmit processor 264 may be precoded by TX MIMO processor 266 if applicable, further processed by the modulators 254*a* through 254*r* (e.g., for SC-FDM, etc.), and transmitted to the base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 28 and/or other processors and modules at UE 115 may perform or direct the execution of various processes for the techniques described herein, such as to perform or direct the execution illustrated in FIGS. 5-7, and/or other processes for the techniques described herein. Memories 242 and 282 may store data and program codes for base station 105 and UE 115, respectively. Scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In some implementations, UE 115 is configurable for NR-U operations. In such implementations, UE 115 is configured for radio access network (RAN)-centric data collection. To illustrate, UE 115 may be configured for collection, storage, reporting, or a combination thereof, of NR-U specific data collection. For example, the present disclosure describes the NR-U specific data collection may be used for or correspond to radio link failure (RLF) report for listen before talk (LBT) failure, random access channel (RACH) report with LBT failure information, connection establishment failure (CEF) report to support RACH failure with LBT failure indication, or a combination thereof. As another example, the present disclosure describes the NR-U specific data collection may be used for or correspond to logged MDT for Received Signal Strength Indicator (RSSI) and channel occupancy report. Additionally, the present disclosure also describes the NR-U specific data collection may be used for or correspond to immediate MDT for RSSI and channel occupancy report.

Figure 3:
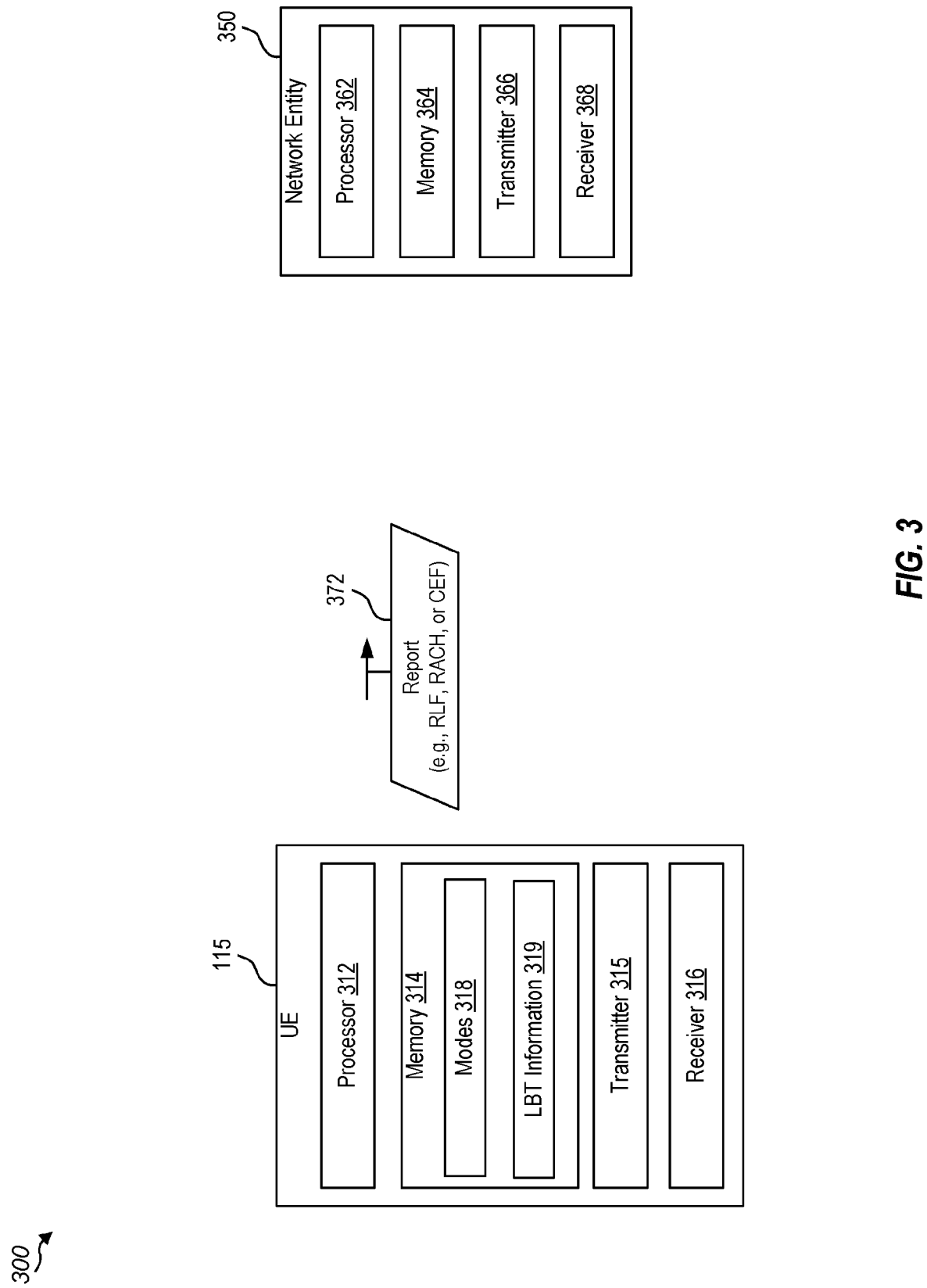
FIG. 3 is a block diagram of an illustrative implementation of a system configured to provide data collection for a user equipment (UE) configurable for new radio-unlicensed (NR-U) according to some aspects.

FIG. 3 is a block diagram of an example wireless communications system 300 configured to provide data collection for a user equipment (UE) configurable for NR-U operations. In some examples, wireless communications system 300 may implement aspects of wireless network 100. Wireless communications system 300 includes UE 115 and a network entity 350. Network entity 350 may include or correspond to base station 105, a network, a core network, or another network device, as illustrative, non-limiting examples. Although one UE and one network entity are illustrated, in other implementations, wireless communications system 300 may include more than one UEs, more than one network entity, or both.

UE 115 can include a variety of components (e.g., structural, hardware components) used for carrying out one or more functions described herein. For example, these components can include a processor 312, a memory 314, a transmitter 315, and a receiver 316. Processor 312 may be configured to execute instructions stored at memory 314 to perform the operations described herein. In some implementations, processor 312 includes or corresponds to controller/processor 280, and memory 314 includes or corresponds to memory 282.

Memory 314 may include one or more modes 318 and LBT information 319. Modes 318 may include one or more modes of UE 115, such as an NR mode, an NR-U mode, one or more channel access schemes (e.g., category 1, category 2, category 3, or category 4), an active mode, or a non-active mode. The non-active mode may include an idle mode, an inactive mode, a low-power mode, or another mode, as illustrative, non-limiting examples.

LBT information 319 may include a RLF-cause, a RLF type, a number of consistent LBT failure(s), a cell identify (where a LBT failure occurred), an uplink (UL) transmission type, a number of bandwidth parts (BWPs), a BWP identifier for one or more BWPs, a BWP frequency for one or more BWPs, an interface type, a channel access scheme identifier, a number of LBT failure(s) detected prior to a RACH attempt, an indication of resource selection due to a LBT failure, a cell ID, a tracking area identity (TAI), an NR-U RACH report identifier, an NR RACH report identifier, a RACH failure cause value for an LBT failure, an indication of UL LBT failure, an indication of DL LBT failure, or a combination thereof.

The RLF-cause, such as an RLF-cause for NR-U may indicate a missing radio link monitoring (RLM)-reference signal (RS) or a consistent LBT failure. The RLF type may indicate a downlink (DL) failure or a UL LBT failure. The cell identity may include or indicate a primary cell (Pcell), a primary Scell (PSCell), or a secondary cell (Scell) where an LBT failure is detected. The UL transmissions type may include or indicate a scheduling request (SR), RACH, or physical uplink shared channel (PUSCH). The interface type may include or indicate one or more interface types, such as wireless fidelity (wifi).

The channel access scheme identifier may include or indicate a channel access scheme for NR-based access for an unlicensed spectrum. For example, the channel access scheme identifier may include or indicate a category, such as a category 1, a category 2, a category 3, or a category 4, as illustrative, non-limiting example. The category 1 may include or indicate immediate transmission after a short switching gap. The category 2 may include or indicate LBT without random back-off. The category 3 may include or indicate LBT with random back-off with a contention window of fixed size. The category 4 may include or indicate LBT with random back-off with a contention window of variable size.

Transmitter 315 is configured to transmit data to one or more other devices, and receiver 316 is configured to receive data from one or more other devices. For example, transmitter 315 may transmit data, and receiver 316 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 315 and receiver 316 may be replaced with a transceiver. Additionally, or alternatively, transmitter 315, receiver 316, or both may include or correspond to one or more components of UE 115 described with reference to FIG. 2.

Network entity 350 can include a variety of components (e.g., structural, hardware components) used for carrying out one or more functions described herein. For example, these components can include processor 362, memory 364, transmitter 366, and receiver 368. Processor 362 may be configured to execute instructions stored at memory 364 to perform the operations described herein. In some implementations, processor 362 includes or corresponds to controller/processor 240, and memory 364 includes or corresponds to memory 242.

Transmitter 366 is configured to transmit data to one or more other devices, and receiver 368 is configured to receive data from one or more other devices. For example, transmitter 366 may transmit data, and receiver 368 may receive data, via a network, such as a wired network, a wireless network, or a combination thereof. For example, network entity 350 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 356 and receiver 368 may be replaced with a transceiver. Additionally, or alternatively, transmitter 366, receiver, 368, or both may include or correspond to one or more components of base station 105 described with reference to FIG. 2.

In a particular implementation, wireless communications system 300 includes a 5G network. For example, UE 115 may include 5G UEs (e.g., UEs configured to operate in accordance with a 5G network). Network entity 350 may include a 5G base station (e.g., a base station configured to operate in accordance with a 5G network).

During operation of wireless communications system 300, UE 115 determines LBT information 319. LBT information 319 may include LBT failure information. UE 115 may generate a report 372 that includes LBT information 319. The report may include a radio link failure (RLF) report, a random access channel (RACH) report, or a connection establishment failure (CEF) report. UE 115 transmits report 372 to network entity 350.

In some implementations, a UE may be configured to provide a RLF report for a LBT failure. In NR-U, consistent LBT failures can lead to RLF, at least for uplink (UL) transmissions, for which consistent failures can currently eventually lead to RLF. To support mobility robustness optimization (MRO) for NR-U, user equipment (UE) RLF report for NR-U may be supported in NR. The RLF report of NR-U may include on or more portions of a RLF report for NR. Additionally, or alternatively, the RLF report for NR-U may include LBT information, such as LBT failure related information (e.g, LBT failure information). The LBT information may include a RLF-cause for NR-U (e.g, a missing RLM-RS, consistent LBT failure, etc.), a RLF type (e.g., downlink (DL) or UL LBT failure), a cell identity—Pcell/PSCell/Scell where a LBT failure is detected, a UL transmissions type (e.g., SR, RACH, physical uplink shared channel (PUSCH)), a number of "N" BWPs with UL LBT failure, a BWP ID/frequency for each BWP, an interference type (e.g., a wifi), a channel access schemes for NR-based access for unlicensed spectrum, or a combination thereof. The channel access schemes may include or indicate Category 1: Immediate transmission after a short switching gap, Category 2: LBT without random back-off, Category 3: LBT with random back-off with a contention window of fixed size, or Category 4: LBT with random back-off with a contention window of variable size.

In some implementations, a UE may be configured to provide a RACH report with LBT information (e.g., LBT failure information). In NR-U for RACH procedure, a medium access control (MAC) may return to a resource selection step if LBT fails for Msg1 transmission opportunity(ies). In some implementations, a network may enable automatic RACH parameter settings based on a RACH report received from a UE and by PRACH parameters exchange between gNBs. The RACH report (for NR-U) may include one or more portions of a NR RACH report. Additionally, or alternatively, the RACH report may include LBT information, such as LBT failure information Th LBT information may include or indicate a number of LBT failure detection(s) before each RACH attempt, an indication of resource selection due to LBT failure, or a combination thereof. The RACH report for NR-U can be collected and stored by the UE and reported to NR and vice versa. In some implementations, the RACH report (for NR-U) may include cell ID/tracking area identity (TAI) for each of one or more RACH report entries (to enable access node RACH report retrieval and distribution), an identifier in each of the one or more entries of the RACH report to identify the RACH report for NR-U and the RACH report for NR, an indicator of a channel access scheme for NR-based access for unlicensed spectrum, or a combination thereof. The channel access schemes may include or indicate Category 1: Immediate transmission after a short switching gap, Category 2: LBT without random back-off, Category 3: LBT with random back-off with a contention window of fixed size, or Category 4: LBT with random back-off with a contention window of variable size.

In some implementations, a UE may be configured to provide a connection establishment failure (CEF) report with LBT information, such as a LBT Failure Indication. The CEF report for NR-U may include one or more portions of a NR accessibility report (e.g., a LTE accessibility report). The UE may log failed RRC connection establishments and RRC resume failure for NR. The CEF report may include or indicate a failed cell id, a radio measurement results and neighboring cells, including SSB index of the downlink beams of both serving cell and neighbor cells, tagged with location information, if available. Additionally, in some implementations, the CEF report may include RACH failure information, such as a SSB index, number of sent preambles on each tried SSB and a flag on detected contention. The flag may be per cell, RACH attempt, or SSB. Additionally, or alternatively, the RACH failure information may include the LBT information, such as an LBT failure indication. The failure information may include a RACH failure cause value for a LBT failure, an indication of UL LBT failure or DL LBT failure, a number of consistent LBT failure(s), an interference type (e.g., wifi), a BWP ID/frequency/cell identity where an LBT failure is detected, an indication of a channel access schemes for NR-based access for unlicensed spectrum, or a combination thereof. The channel access schemes may include or indicate Category 1: Immediate transmission after a short switching gap, Category 2: LBT without random back-off, Category 3: LBT with random back-off with a contention window of fixed size, or Category 4: LBT with random back-off with a contention window of variable size.

Thus, FIG. 3 describes radio access network (RAN)-centric data collection for UEs configurable for NR-U operations. For example, the operations described herein provide collection, storage, reporting, or a combination thereof, of NR-U specific data collection. For example, FIG. 3 describes the NR-U specific data collection may be used for or correspond to radio link failure (RLF) report for listen before talk (LBT) failure, random access channel (RACH) report with LBT failure information, connection establishment failure (CEF) report to support RACH failure with LBT failure indication, or a combination thereof. The data collection may advantageously be used to improve device (e.g., UE) performance, such as battery life, throughput, latency, reliability, new radio (NR) functionality and/or features, or NR-U functionality and/or features.

Figure 4:
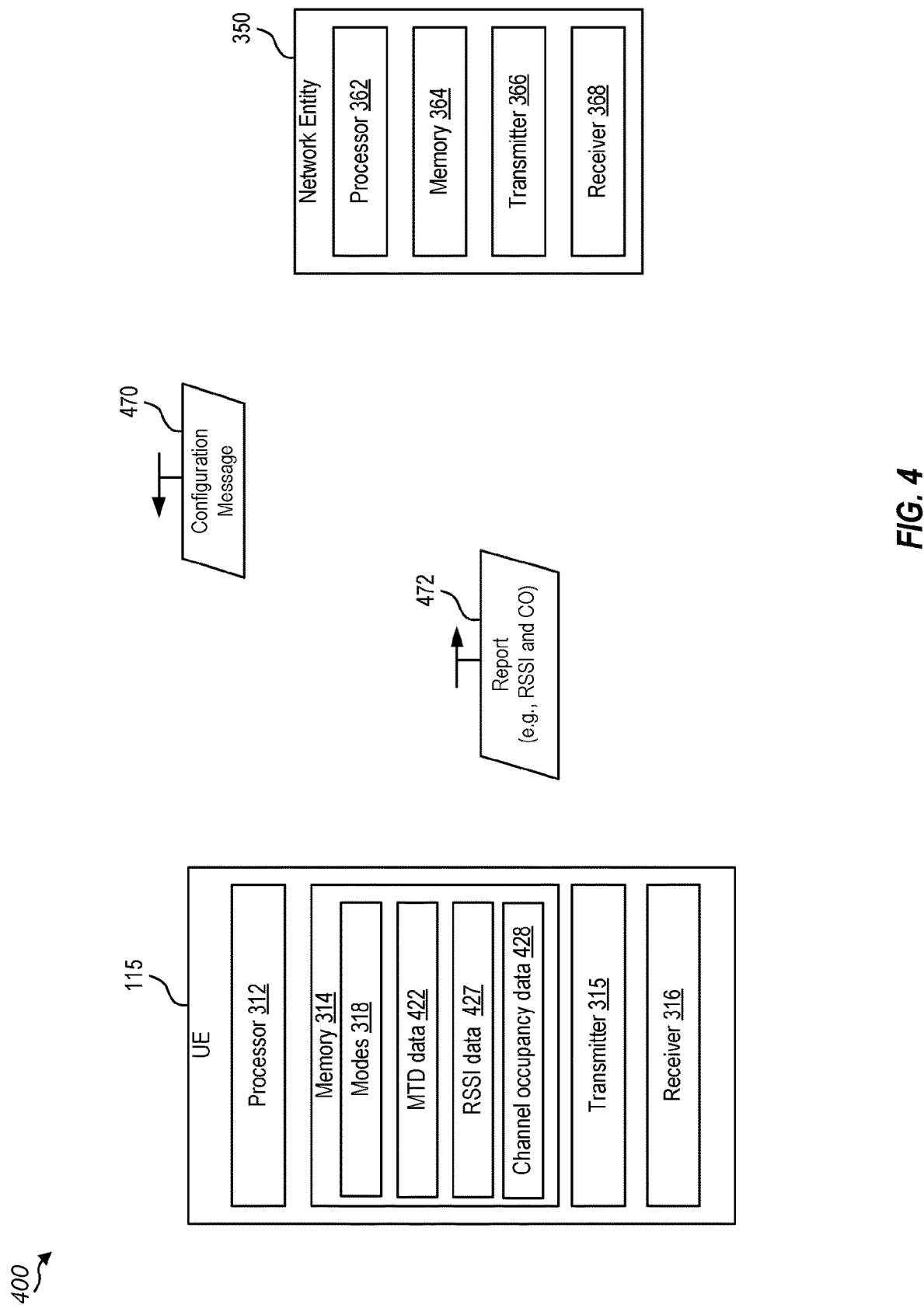
FIG. 4 is a block diagram of another illustrative implementation of a system configured to provide data collection for a UE configurable for NR-U according to some aspects.

FIG. 4 is a block diagram of an example wireless communications system 400 configured to provide data collection for a user equipment (UE) configurable for NR-U operations. In some examples, wireless communications system 400 may implement aspects of wireless network 100 or wireless communications system 300. Wireless communications system 300 includes UE 115 and a network entity 350. Network entity 350 may include or correspond to base station 105, a network, a core network, or another network device, as illustrative, non-limiting examples. Although one UE and one network entity are illustrated, in other implementations, wireless communications system 300 may include more than one UEs, more than one network entity, or both.

UE 115 can include a variety of components (e.g., structural, hardware components) used for carrying out one or more functions described herein. For example, these components can include a processor 312, a memory 314, a transmitter 315, and a receiver 316. Processor 312 may be configured to execute instructions stored at memory 314 to perform the operations described herein. In some implementations, processor 312 includes or corresponds to controller/processor 280, and memory 314 includes or corresponds to memory 282.

Memory 314 may include one or more modes 318, MTD data 422 (e.g., logged MDT data or immediate MDT data), RSSI data 427 (e.g., an RSSI measurement result(s)), and channel occupancy data 428 (e.g., a channel occupancy measurement result(s)). Modes 318 may include one or more modes of UE 115, such as an NR mode, an NR-U mode, one or more channel access schemes (e.g., category 1, category 2, category 3, or category 4), an active mode, or a non-active mode. The non-active mode may include an idle mode, an inactive mode, a low-power mode, or another mode, as illustrative, non-limiting examples.

The RSSI data 427, the channel occupancy data 428, or a combination thereof, may include an occupancy bandwidth, a channel occupancy time, an NR-U frequency, an NR-U cell ID, a time stamp, location information, sensor data, an indicator of a channel occupancy status (e.g., a low occupancy, a medium occupancy, a high occupancy), or a combination thereof.

Transmitter 315 is configured to transmit data to one or more other devices, and receiver 316 is configured to receive data from one or more other devices. For example, transmitter 315 may transmit data, and receiver 316 may receive data, via a network, such as a wired network, a wireless network, or a combination thereof. For example, UE 115 may be configured to transmit or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 315 and receiver 316 may be replaced with a transceiver. Additionally, or alternatively, transmitter 315, receiver 316, or both may include or correspond to one or more components of UE 115 described with reference to FIG. 2.

Network entity 350 can include a variety of components (e.g., structural, hardware components) used for carrying out one or more functions described herein. For example, these components can include processor 362, memory 364, transmitter 366, and receiver 368. Processor 362 may be configured to execute instructions stored at memory 364 to perform the operations described herein. In some implementations, processor 362 includes or corresponds to controller/processor 240, and memory 364 includes or corresponds to memory 242.

Transmitter 366 is configured to transmit data to one or more other devices, and receiver 368 is configured to receive data from one or more other devices. For example, transmitter 366 may transmit data, and receiver 368 may receive data, via a network, such as a wired network, a wireless network, or a combination thereof. For example, network entity 350 may be configured to transmit or receive data via a direct device-to-device connection, a LAN, a WAN, a modem-to-modem connection, the Internet, intranet, extranet, cable transmission system, cellular communication network, any combination of the above, or any other communications network now known or later developed within which permits two or more electronic devices to communicate. In some implementations, transmitter 356 and receiver 368 may be replaced with a transceiver. Additionally, or alternatively, transmitter 366, receiver, 368, or both may include or correspond to one or more components of base station 105 described with reference to FIG. 2.

In a particular implementation, wireless communications system 300 includes a 5G network. For example, UE 115 may include 5G UEs (e.g., UEs configured to operate in accordance with a 5G network). Network entity 350 may include a 5G base station (e.g., a base station configured to operate in accordance with a 5G network).

During operation of wireless communications system 400, UE 115 may receive a configuration message 370 from network entity 350. The configuration message 470 may indicate to log the RSSI and channel occupancy information with logged minimization of drive test (MDT) information, or may indicate to configure immediate MDT measurements for RSSI and channel occupancy. In some implementations, the configuration message 470 may be based on an RRC measurement procedure for configuration and reporting including location information. Additionally, or alternatively, the configuration message 470 may include or indicate a NR-U frequency list/cell ID list for RSSI and channel occupancy logging, a logging area of NR-U, a logging interval for RSSI and channel Occupancy measurement, or a combination thereof.

UE 115 determines received signal strength indicator (RSSI) and channel occupancy information for new radio-unlicensed (NR-U) operation of the UE. The RSSI and channel occupancy information may include or correspond to RSSI data 427, channel occupancy data 428, or a combination there. The RSSI and channel occupancy information includes a measurement result of RSSI and channel occupancy, an indicator of channel occupancy status (low occupancy, medium occupancy, high occupancy), an occupancy bandwidth, an NR-U frequent/Cell ID, a channel occupancy time, a time stamp, location information, or a combination thereof.

UE 115 transmits a report 472 including the RSSI and channel occupancy information. In some implementations, report 472 may include MTD data 422, RSSI data 427, channel occupancy data 428, or a combination thereof. Report 472 may include a logged minimization of drive test (MDT) report. Additionally, or alternatively, the report 472 may include an immediate minimization of drive test (MDT) report. The immediate MDT report may include location information, sensor data, or a combination thereof.

In some implementations, a UE may be configured for logged MDT for RSSI and Channel Occupancy Report. For example, NR-U may support RSSI and Channel Occupancy configuration and reporting, such as measurements over an interval (at least for CO) and periodical reporting. In some implementations, logged MDT may support logging of RSSI and Channel Occupancy, such as when in an non-active mode, such as RRC_IDLE/RRC_INACTIVE mode. In some implementations, the network may send a logged measurement configuration (e.g., a configuration) to the UE to log RSSI and Channel occupancy in RRC Idle or RRC_INACTIVE mode. The configuration may include or indicate a NR-U frequency list/cell ID list for RSSI and channel occupancy logging, a logging area of NR-U, a logging interval for RSSI and channel Occupancy measurement, or a combination thereof. The UE may report content of logged MDT for NR-U RSSI and channel occupancy report. The report may include or indicate a measurement result of RSSI and channel occupancy, an indicator of a channel occupancy status (e.g., low occupancy, medium occupancy, high occupancy), an occupancy bandwidth, an NR-U frequent/Cell ID, a channel occupancy time, a time stamp, location information, or a combination thereof.

In some implementations, the UE may be configured for immediate MDT for RSSI and channel occupancy report. For example, the RSSI and channel occupancy report may be incorporated in an immediate MDT framework. In some implementations, the network may configure an immediate MDT measurement for RSSI and channel occupancy report. For example, the network may configure an immediate MDT measurement for RSSI and channel occupancy report to an RRC_CONNECTED mode UE for NR unlicensed frequency. The configuration may be based on an RRC measurement procedure for configuration and reporting with location information. The measurement and report of RSSI and channel occupancy include one or more portions of a LTE License Assisted Access (LAA) RSSI and channel occupancy measurement/report. The report may include location information/sensor data.

Thus, FIG. 4 describes radio access network (RAN)-centric data collection for UEs configurable for NR-U operations. For example, the operations described herein provide collection, storage, reporting, or a combination thereof, of NR-U specific data collection. For example, FIG. 4 describes the NR-U specific data collection may be used for or correspond to logged MDT for Received Signal Strength Indicator (RSSI) and Channel Occupancy report. Additionally, FIG. 4 also describes the NR-U specific data collection may be used for or correspond to immediate MDT for RSSI and Channel Occupancy report. The data collection may advantageously be used to improve device (e.g., UE) performance, such as battery life, throughput, latency, reliability, new radio (NR) functionality and/or features, or NR-U functionality and/or features.

Figures 5, 6:
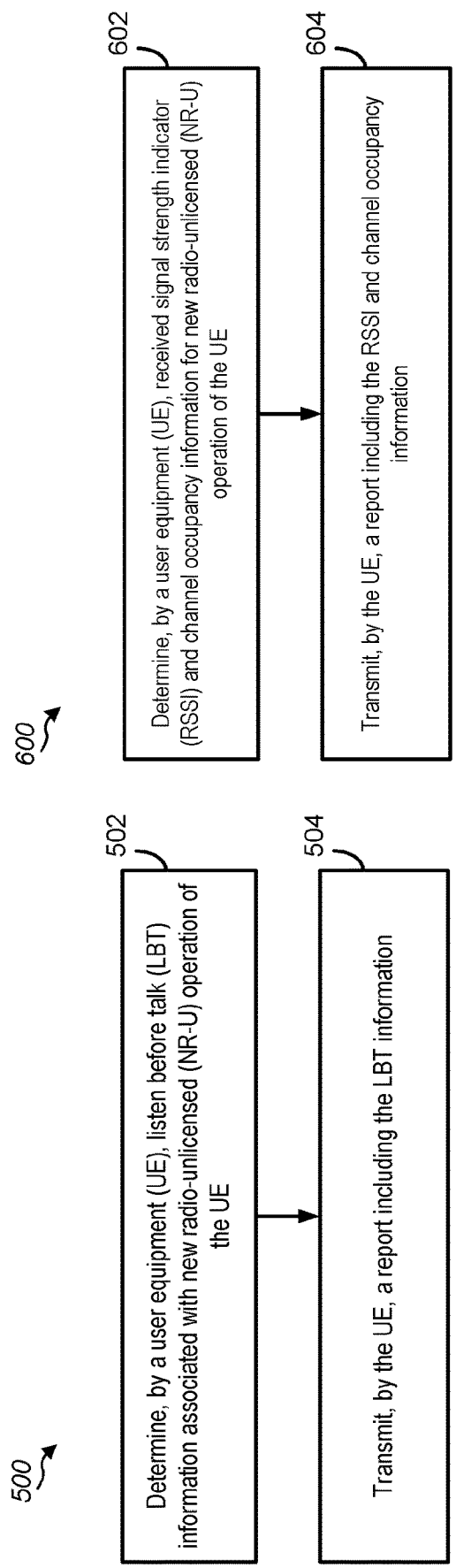
FIG. 5 is a flow diagram illustrating example blocks executed by a UE according to some aspects.
FIG. 6 is a flow diagram illustrating example blocks executed by a UE according to some aspects.
Figure 8:
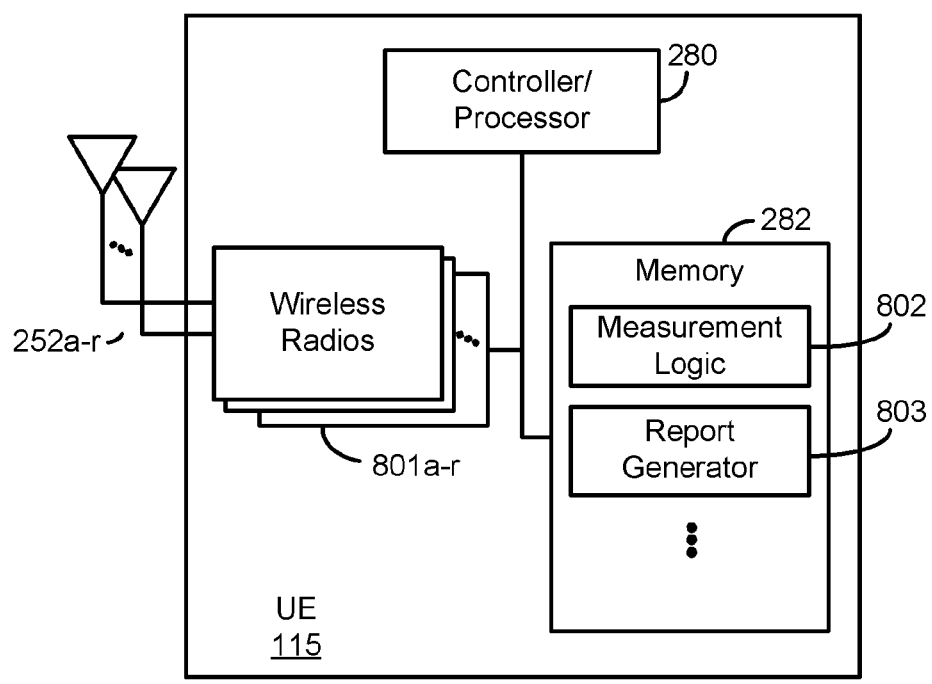
FIG. 8 is a block diagram conceptually illustrating a design of a UE configured according to some aspects.

FIGS. 5-6 are flow diagrams illustrating example methods performed by a UE for communication. For example, example blocks of the methods may cause the UE to perform data collection associated with NR-U operations according to some aspects of the present disclosure. The example blocks will also be described with respect to UE 115 as illustrated in FIG. 8. FIG. 8 is a block diagram conceptually illustrating an example design of a UE configured to perform data collection associated with NR-U operations according to one aspect of the present disclosure. UE 115 includes the structure, hardware, and components as illustrated for UE 115 of FIG. 2 or 3-4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 801a-r and antennas 252a-r. Wireless radios 801a-r includes various components and hardware, as illustrated in FIG. 2 for UE 115, including modulator/demodulators 254a-r, MIMO detector 256, receive processor 258, transmit processor 264, and TX MIMO processor 266.

As shown, memory 282 may include measurement logic 802 and report generator 803. Measurement logic 802 may be configured to monitor or measure data and to generate or calculate measured data (e.g., result data). For example, the data monitored, measured, generated, or calculated by measurement logic 802 may include or correspond LBT information 319, MTD data 422, RSSI data 427, channel occupancy data 428, location data (e.g., GPS data), or a combination thereof. Report generator 803 may be configured to generate one or more reports, such as report 372, report 472, or a combination thereof. In some aspects, measurement logic 802, report generator 803, or a combination thereof, may include or correspond to processor(s) 302. UE 115 may receive signals from and/or transmit signal to a one or more network entities, such as base station 105, network entity 350, a network, or a core network device, as illustrated in FIG. 11.

Referring to FIGS. 5, a sample flow diagram of method 500 of UE operations for communication is shown. In some implementations, method 500 may be performed by UE 115. In other implementations, method 500 may be performed by an apparatus configured for wireless communication. For example, the apparatus may include at least one processor, and a memory coupled to the processor. The processor may be configured to perform operations of method 500. In other implementations, method 500 may be performed or executed using a non-transitory computer-readable medium having program code recorded thereon. The program code may be program code executable by a computer for causing the computer to perform operations of method 500.

As illustrated at block 502, a UE determines listen before talk (LBT) information associated with new radio-unlicensed (NR-U) operation of the UE. The UE may be configured for NR-U operation during determining the LBT information. The LBT information may include LBT failure information. The LBT information may include or correspond to LBT information 319. For example, UE 115 may determine the LBT information using measurement logic 1002.

In some implementations, the LBT information includes a radio link failure (RLF)-cause, a RLF type, a number of consistent LBT failure(s), a cell identify, an uplink (UL) transmission type, a number of bandwidth parts (BWPs), a BWP identifier for one or more BWPs, a BWP frequency for one or more BWPs, an interface type, a channel access scheme identifier, a number of LBT failure(s) detected prior to a RACH attempt, an indication of resource selection due to a LBT failure, a cell ID, a tracking area identity (TAI), an NR-U random access channel (RACH) report identifier, a new radio (NR) RACH report identifier, a RACH failure cause value for an LBT failure, an indication of UL LBT failure, an indication of DL LBT failure, or a combination thereof.

At 504, the UE transmits a report including the LBT information. For example, the report may include or correspond to report 372. The report may include a radio link failure (RLF) report, a random access channel (RACH) report, or a connection establishment failure (CEF) report.

In some implementations, transmitting the report includes transmitting a first report and a second report. The first report includes one report selected from the group comprising a radio link failure (RLF) report, a random access channel (RACH) report, and a connection establishment failure (CEF) report, and the second report includes one report selected form the group comprising a radio link failure (RLF) report, a random access channel (RACH) report, and a connection establishment failure (CEF) report.

In some implementations, the report includes a radio link failure (RLF) report. In some such implementations, the LBT information includes a radio link failure (RLF)-cause, a RLF type, a number of consistent LBT failure(s), a cell identify, an uplink (UL) transmission type, a number of bandwidth parts (BWPs), a BWP identifier for one or more BWPs, a BWP frequency for one or more BWPs, an interface type, a channel access scheme identifier, or a combination thereof.

In some implementations, the report includes a random access channel (RACH) report. In some such implementations, the LBT information includes a channel access scheme identifier, a number of LBT failure(s) detected prior to a RACH attempt, an indication of resource selection due to a LBT failure, a cell ID, a tracking area identity (TAI), an NR-U random access channel (RACH) report identifier, a new radio (NR) RACH report identifier, a RACH failure cause value for an LBT failure, or a combination thereof.

In some implementations, the report includes a connection establishment failure (CEF) report. In some such implementations, the LBT information includes a radio link failure (RLF)-cause, a RLF type, a number of consistent LBT failure(s), a BWP identifier for one or more BWPs, a BWP frequency for one or more BWPs, an interface type, a channel access scheme identifier, a cell ID, an indication of UL LBT failure, an indication of DL LBT failure, or a combination thereof.

Thus, method 500 enables radio access network (RAN)-centric data collection for UEs configurable for NR-U operations. For example, the operations described herein provide collection, storage, reporting, or a combination thereof, of NR-U specific data collection. For example, method 500 describes the NR-U specific data collection may be used for or correspond to radio link failure (RLF) report for listen before talk (LBT) failure, random access channel (RACH) report with LBT failure information, connection establishment failure (CEF) report to support RACH failure with LBT failure indication, or a combination thereof. The data collection may advantageously be used to improve device (e.g., UE) performance, such as battery life, throughput, latency, reliability, new radio (NR) functionality and/or features, or NR-U functionality and/or features.

Referring to FIGS. 6, a sample flow diagram of method 600 of UE operations for communication is shown. In some implementations, method 600 may be performed by UE 115. In other implementations, method 600 may be performed by an apparatus configured for wireless communication. For example, the apparatus may include at least one processor, and a memory coupled to the processor. The processor may be configured to perform operations of method 600. In other implementations, method 600 may be performed or executed using a non-transitory computer-readable medium having program code recorded thereon. The program code may be program code executable by a computer for causing the computer to perform operations of method 600.

As illustrated at block 602, a UE determines received signal strength indicator (RSSI) and channel occupancy information for new radio-unlicensed (NR-U) operation of the UE. The UE is configured for NR-U operation during determining the RSSI and channel occupancy information. The RSSI and channel occupancy information may include or correspond to RSSI data 427, channel occupancy data 428, or a combination thereof. The RSSI and channel occupancy information may include a measurement result of RSSI and channel occupancy, an indicator of channel occupancy status (low occupancy, medium occupancy, high occupancy), an occupancy bandwidth, an NR-U frequent/Cell ID, a channel occupancy time, a time stamp, location information, or a combination thereof. For example, UE 115 may determine the RSSI and channel occupancy information using measurement logic 1002.

At 604, the UE transmitting, by the UE, a report including the RSSI and channel occupancy information. The report may include or correspond to report 472. For example, the report may include a logged minimization of drive test (MDT) report or an immediate minimization of drive test (MDT) report. The immediate MDT report may include location information, sensor data, or a combination thereof.

In some implementations, method 600 may further include receiving, by the UE from a network entity, a configuration message to log the RSSI and channel occupancy information with logged minimization of drive test (MDT) information, a configuration message to configure immediate MDT measurements for RSSI and channel occupancy, or a combination thereof. The configuration message may include or correspond to configuration message 470. In some implementations, the configuration message is based on or included in an RRC measurement procedure for configuration and reporting including location information. Additionally, or alternatively, the configuration message includes or indicates a NR-U frequency list/cell ID list for RSSI and channel occupancy logging, a logging area of NR-U, a logging interval for RSSI and channel occupancy measurement, or a combination thereof.

In some implementations, method 600 may include receiving, by the UE from a network entity, a configuration message to log the RSSI and channel occupancy information with logged minimization of drive test (MDT) information. The configuration may include a NR-U frequency list for RSSI and channel occupancy logging, a NR-U cell ID list for RSSI and channel occupancy logging, a logging area of NR-U, a logging interval for RSSI and channel occupancy measurement, or a combination thereof. Additionally, or alternatively, method 600 may include logging the RSSI and channel occupancy with logged MDT while the UE is in a non-active mode. The non-active mode may be an RRC_IDLE mode or an RRC_INACTIVE mode. In some implementations, RSSI and channel occupancy information includes a measurement result of RSSI and channel occupancy, an indicator of a channel occupancy status, an occupancy bandwidth, an NR-U frequency, a NR-U cell ID, a channel occupancy time, a time stamp, location information, or a combination thereof.

In some implementations, method 600 may include receiving, by the UE from a network entity, a configuration message to configure immediate MDT measurements for RSSI and channel occupancy. In some such implementations, wherein the UE determines the immediate MDT measurements and the RSSI and channel occupancy information while the UE is in a radio resource control (RRC) connected mode. The RSSI and channel occupancy information may correspond to location information of the UE.

Thus, method 600 enables radio access network (RAN)-centric data collection for UEs configurable for NR-U operations. For example, the operations described herein provide collection, storage, reporting, or a combination thereof, of NR-U specific data collection. For example, method 600 describes the NR-U specific data collection may be used for or correspond to logged MDT for Received Signal Strength Indicator (RSSI) and Channel Occupancy report. Additionally, method 600 also describes the NR-U specific data collection may be used for or correspond to immediate MDT for RSSI and Channel Occupancy report. The data collection may advantageously be used to improve device (e.g., UE) performance, such as battery life, throughput, latency, reliability, new radio (NR) functionality and/or features, or NR-U functionality and/or features.

It is noted that one or more blocks (or operations) described with reference to FIGS. 5-6 may be combined with one or more blocks (or operations) of another of figure. For example, one or more blocks of FIG. 6-6 may be combined with one or more blocks (or operations) of another of FIGS. 2-4. Additionally, or alternatively, one or more operations described above with reference to FIGS. 1-6 and 8 may be combine with one or more operations described with reference to FIG. 9.

Figure 7:
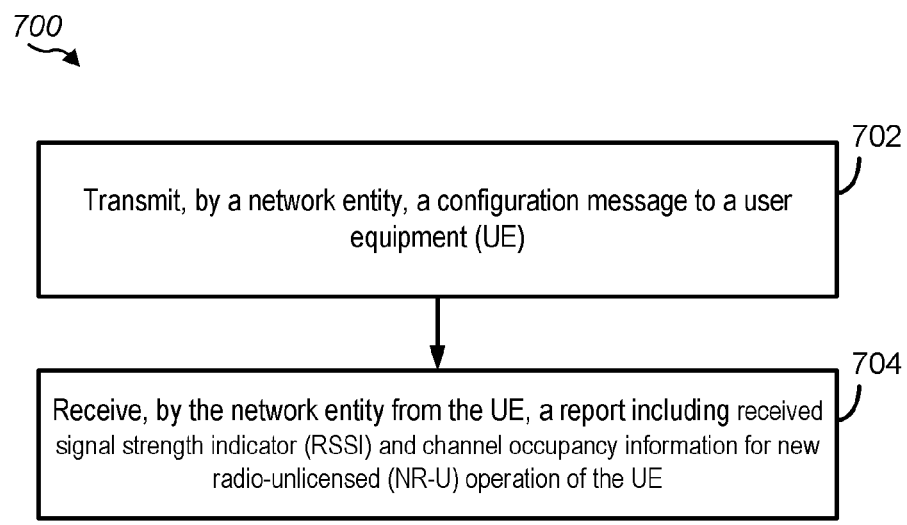
FIG. 7 is a flow diagram illustrating example blocks executed by a network entity according to some aspects.
Figure 9:
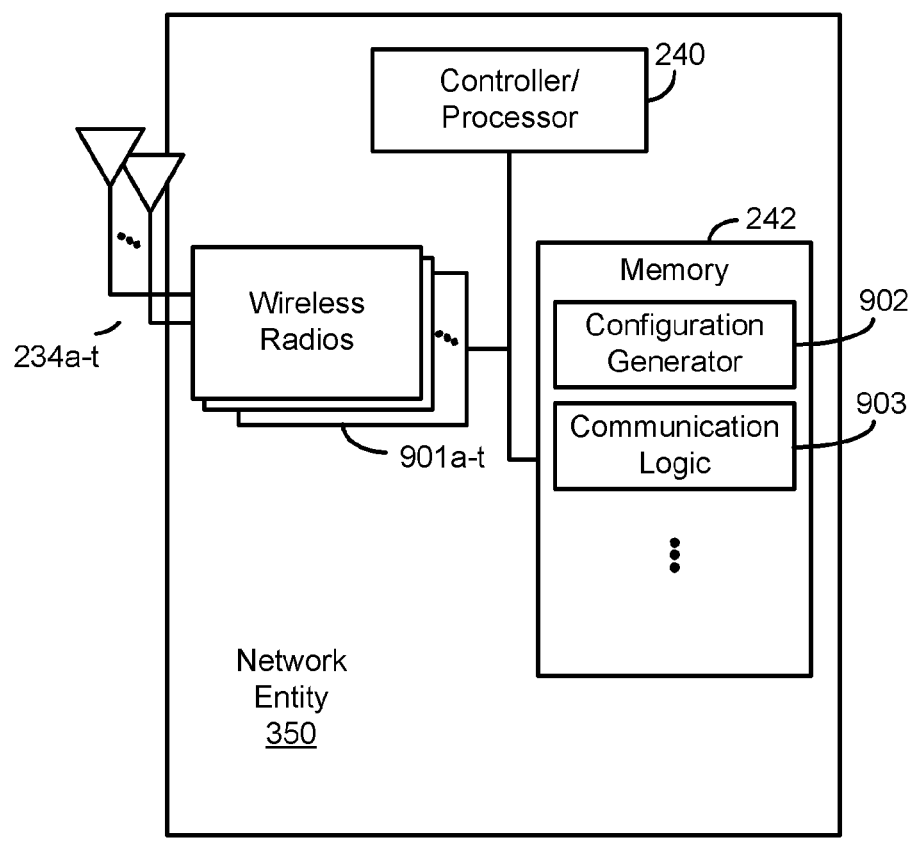
FIG. 9 is a block diagram conceptually illustrating a design of a network entity configured according to some aspects.

FIG. 7 is a flow diagram illustrating an example method 700 performed by a network entity for communication. For example, example blocks of method 700 may cause network entity to communicate a configuration message according to some aspects of the present disclosure. The example blocks will also be described with respect to network entity 350 as illustrated in FIG. 9. FIG. 9 is a block diagram conceptually illustrating an example design of a network entity 350, such as base station 105, a network, or a core network, as illustrative, non-limiting examples.

Network entity 350 includes the structure, hardware, and components as illustrated for network entity (e.g., 105, 350) of FIGS. 2-4. For example, network entity 350 includes controller/processor 240, which operates to execute logic or computer instructions stored in memory 242, as well as controlling the components of network entity 350 that provide the features and functionality of network entity 350. Network entity 350, under control of controller/processor 240, transmits and receives signals via wireless radios 901a-t and antennas 234a-t. Wireless radios 901a-t includes various components and hardware, as illustrated in FIG. 2 for network entity 350 (e.g., 105), including modulator/demodulators 232a-t, transmit processor 220, TX MIMO processor 230, MIMO detector 236, and receive processor 238. As shown, memory 242 may include a configuration generator 902 and communication logic 903. Configuration generator 902 may be configured to generate one or more configurations or configuration messages, such as measurement configuration 470. Communication logic 903 may enable network entity 350 to perform one or more operations for wireless communication. In some aspects, configuration generator 902, communication logic 903, or a combination thereof, may include or correspond to processor(s) 362. Network entity 350 may receive signals from and/or transmit signal to a UE, such as UE 115 as illustrated in FIG. 8.

Referring to FIG. 7, a sample flow diagram of method 700 of network entity operations for communication is shown. In some implementations, method 700 may be performed by an apparatus configured for wireless communication, such as a network entity 350 (e.g., 105). For example, the apparatus may include at least one processor, and a memory coupled to the processor. The processor may be configured to perform operations of method 700. In other implementations, method 700 may be performed or executed using a non-transitory computer-readable medium having program code recorded thereon. The program code may be program code executable by a computer for causing the computer to perform operations of method 700.

As illustrated at block 702, method 700 includes transmitting, by a network entity, a configuration message to a user equipment (UE). The configuration message may include or correspond to configuration message 470. In some implementations, the configuration includes a NR-U frequency list for RSSI and channel occupancy logging, a NR-U cell ID list for RSSI and channel occupancy logging, a logging area of NR-U, a logging interval for RSSI and channel occupancy measurement, or a combination thereof. The UE may include or correspond to UE 115. Network generator 350 may generate the configuration message using configuration generator 902. Network entity 350 may transmit the measurement configuration message using wireless radios 1101a-t, antennas 234a-t, and communication logic 903.

At 704, method 700 further includes the network entity receiving, from the UE, a report including received signal strength indicator (RSSI) and channel occupancy information for new radio-unlicensed (NR-U) operation of the UE. The report may include or correspond to report 472. The report may include a logged minimization of drive test (MDT) report or an immediate minimization of drive test (MDT) report. Network entity 350 may receive the report using wireless radios 901a-t, antennas 234a-t, and communication logic 903.

In some implementations, method 700 further includes receiving, by the network entity, an additional report. The additional report may include or correspond to report 372. For example, the additional report may include listen before talk (LBT) information associated with the NR-U operation of the UE. In some implementations, the additional report includes a radio link failure (RLF) report, a random access channel (RACH) report, or a connection establishment failure (CEF) report.

Thus, method 700 enables radio access network (RAN)-centric data collection for UEs configurable for NR-U operations. The data collection may advantageously be used to improve device (e.g., UE) performance, such as battery life, throughput, latency, reliability, new radio (NR) functionality and/or features, or NR-U functionality and/or features.

It is noted that one or more blocks (or operations) described with reference to FIG. 7 may be combined with one or more blocks (or operations) of another of figure. For example, one or more blocks of FIG. 7 may be combined with one or more blocks (or operations) of another of FIGS. 2-4. Additionally, or alternatively, one or more operations described above with reference to FIGS. 1-4, 7, and 9 may be combine with one or more operations described with reference to FIG. 8.

In some aspects, data collection for data collection for NR-U may include a wireless device receiving determining, by a user equipment (UE), listen before talk (LBT) information associated with new radio-unlicensed (NR-U) operation of the UE; and transmitting, by the UE, a report including the LBT information. In some implementations, the wireless device may include at least one processor, and a memory coupled to the processor. The processor may be configured to perform operations described herein with respect to the wireless device. In other implementations, a non-transitory computer-readable medium having program code recorded thereon and the program code may be executable by a computer for causing the computer to perform operations described herein with reference to the wireless device.

In a first aspect, the UE is configured for NR-U operation during determining the LBT information.

In a second aspect, alone or in combination with the first aspect, the LBT information includes LBT failure information.

In a third aspect, alone or in combination with one or more of the first through second aspects, the LBT information includes a radio link failure (RLF)-cause, a RLF type, a number of consistent LBT failure(s), a cell identify, an uplink (UL) transmission type, a number of bandwidth parts (BWPs), a BWP identifier for one or more BWPs, a BWP frequency for one or more BWPs, an interface type, a channel access scheme identifier, a number of LBT failure(s) detected prior to a RACH attempt, an indication of resource selection due to a LBT failure, a cell ID, a tracking area identity (TAI), an NR-U random access channel (RACH) report identifier, a new radio (NR) RACH report identifier, a RACH failure cause value for an LBT failure, an indication of UL LBT failure, an indication of DL LBT failure, or a combination thereof.

In a fourth aspect, alone or in combination with one or more of the first through third aspects, the report includes a radio link failure (RLF) report, a random access channel (RACH) report, or a connection establishment failure (CEF) report.

In a fifth aspect, alone or in combination with one or more of the first through fourth aspects may include transmitting the report includes transmitting a first report and a second report; the first report includes one report selected from the group comprising a radio link failure (RLF) report, a random access channel (RACH) report, and a connection establishment failure (CEF) report; and the second report includes one report selected form the group comprising a radio link failure (RLF) report, a random access channel (RACH) report, and a connection establishment failure (CEF) report In a sixth aspect, alone or in combination with one or more of the first through fourth aspects, the report includes a radio link failure (RLF) report; and the LBT information includes a radio link failure (RLF)-cause, a RLF type, a number of consistent LBT failure(s), a cell identify, an uplink (UL) transmission type, a number of bandwidth parts (BWPs), a BWP identifier for one or more BWPs, a BWP frequency for one or more BWPs, an interface type, a channel access scheme identifier, or a combination thereof.

In a seventh aspect, alone or in combination with one or more of the first through fourth aspects, the report includes a random access channel (RACH) report; and the LBT information includes a channel access scheme identifier, a number of LBT failure(s) detected prior to a RACH attempt, an indication of resource selection due to a LBT failure, a cell ID, a tracking area identity (TAI), an NR-U random access channel (RACH) report identifier, a new radio (NR) RACH report identifier, a RACH failure cause value for an LBT failure, or a combination thereof.

In an eighth aspect, alone or in combination with one or more of the first through fourth aspects, the report includes a connection establishment failure (CEF) report; and the LBT information includes a radio link failure (RLF)-cause, a RLF type, a number of consistent LBT failure(s), a BWP identifier for one or more BWPs, a BWP frequency for one or more BWPs, an interface type, a channel access scheme identifier, a cell ID, an indication of UL LBT failure, an indication of DL LBT failure, or a combination thereof.

In some aspects, data collection for NR-U may include a wireless device determining, by a user equipment (UE), received signal strength indicator (RSSI) and channel occupancy information for new radio-unlicensed (NR-U) operation of the UE; and transmitting, by the UE, a report including the RSSI and channel occupancy information. In some implementations, the wireless device may include at least one processor, and a memory coupled to the processor. The processor may be configured to perform operations described herein with respect to the wireless device. In other implementations, a non-transitory computer-readable medium having program code recorded thereon and the program code may be executable by a computer for causing the computer to perform operations described herein with reference to the wireless device.

In a ninth aspect, the UE is configured for NR-U operation during determining the RSSI and channel occupancy information In a tenth aspect, alone or in combination with the ninth aspect, the report includes a logged minimization of drive test (MDT) report or an immediate minimization of drive test (MDT) report.

In an eleventh aspect, alone or in combination with one or more of the ninth through tenth aspects, receiving, from a network entity, a configuration message to log the RSSI and channel occupancy information with logged minimization of drive test (MDT) information.

In a twelfth aspect, alone or in combination with one or more of the ninth through eleventh aspects, the configuration includes a NR-U frequency list for RSSI and channel occupancy logging, a NR-U cell ID list for RSSI and channel occupancy logging, a logging area of NR-U, a logging interval for RSSI and channel occupancy measurement, or a combination thereof.

In a thirteenth aspect, alone or in combination with one or more of the ninth through twelfth aspects, may include logging the RSSI and channel occupancy with logged MDT while the UE is in a non-active mode.

In a fourteenth aspect, alone or in combination with the thirteenth aspect, the non-active mode include a RRC_IDLE mode or a RRC_INACTIVE mode.

In a fifteenth aspect, alone or in combination with one or more of the ninth through fourteenth aspects, the RSSI and channel occupancy information includes a measurement result of RSSI and channel occupancy, an indicator of a channel occupancy status, an occupancy bandwidth, an NR-U frequency, a NR-U cell ID, a channel occupancy time, a time stamp, location information, or a combination thereof.

In a sixteenth aspect, alone or in combination with one or more of the ninth through tenth aspects may include receiving, from a network entity, a configuration message to configure immediate MDT measurements for RSSI and channel occupancy.

In a seventeenth aspect, alone or in combination with the sixteenth aspect, the UE determines the immediate MDT measurements and the RSSI and channel occupancy information while the UE is in a radio resource control (RRC) connected mode.

In an eighteenth aspect, alone or in combination with one or more of the sixteenth through seventeenth aspects, the RSSI and channel occupancy information corresponds to location information of the UE.

In some aspects, data collection for NR-U may include a wireless device transmitting, by a network entity, a configuration message to a user equipment (UE); and receiving, by the network entity from the UE, a report including received signal strength indicator (RSSI) and channel occupancy information for new radio-unlicensed (NR-U) operation of the UE. In some implementations, the wireless device may include at least one processor, and a memory coupled to the processor. The processor may be configured to perform operations described herein with respect to the wireless device. In other implementations, a non-transitory computer-readable medium having program code recorded thereon and the program code may be executable by a computer for causing the computer to perform operations described herein with reference to the wireless device.

In a nineteenth aspect, the report includes a logged minimization of drive test (MDT) report.

In a twentieth aspect, alone or in combination with the nineteenth aspect, the report includes an immediate minimization of drive test (MDT) report.

In a twenty-first aspect, alone or in combination with one or more of the nineteenth through twentieth aspects, the configuration message indicates to log the RSSI and channel occupancy information with logged minimization of drive test (MDT) information or to configure immediate MDT measurements for RSSI and channel occupancy.

In a twenty-second aspect, alone or in combination with one or more of the nineteenth through twentieth aspects, he configuration includes a NR-U frequency list for RSSI and channel occupancy logging, a NR-U cell ID list for RSSI and channel occupancy logging, a logging area of NR-U, a logging interval for RSSI and channel occupancy measurement, or a combination thereof.

In a twenty-third aspect, alone or in combination with one or more of the nineteenth through twenty-second aspects may include receiving an additional report.

In a twenty-fourth aspect, alone or in combination with the twenty-fourth aspect, the additional report includes listen before talk (LBT) information associated with the NR-U operation of the UE.

In a twenty-fifth aspect, alone or in combination with one or more of the twenty-fourth through twenty-fifth aspects, the additional report includes a radio link failure (RLF) report, a random access channel (RACH) report, or a connection establishment failure (CEF) report.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 1-9 described herein include processors, electronics devices, hardware devices, electronics components, logical circuits, memories, software codes, firmware codes, etc., or any combination thereof. In addition, features discussed herein may be implemented via specialized processor circuitry, via executable instructions, and/or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be implemented directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can include RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication performed by a user equipment (UE), the method comprising:
   determining listen before talk (LBT) information associated with new radio-unlicensed (NR-U) operation of the UE; and
   transmitting a report including the LBT information, wherein the LBT information includes a channel access scheme identifier indicating a channel access scheme of a plurality of channel access schemes.

2. The method of claim 1, wherein:
   the UE is configured for NR-U operation during determining the LBT information;
   the LBT information includes LBT failure information; or a combination thereof.

3. The method of claim 1, wherein the LBT information includes a radio link failure (RLF)-cause, a RLF type, a number of consistent LBT failure(s), a cell identify, an uplink (UL) transmission type, a number of bandwidth parts (BWPs), a BWP identifier for one or more BWPs, a BWP frequency for one or more BWPs, an interface type, a number of LBT failure(s) detected prior to a RACH attempt, an indication of resource selection due to a LBT failure, a cell ID, a tracking area identity (TAI), an NR-U random access channel (RACH) report identifier, a new radio (NR) RACH report identifier, a RACH failure cause value for an LBT failure, an indication of UL LBT failure, an indication of DL LBT failure, or a combination thereof.

4. The method of claim 1, wherein the report includes a radio link failure (RLF) report, a random access channel (RACH) report, or a connection establishment failure (CEF) report.

5. The method of claim 1, wherein:
   transmitting the report includes transmitting a first report and a second report;
   the first report includes one report selected from a group comprising a radio link failure (RLF) report, a random access channel (RACH) report, and a connection establishment failure (CEF) report; and
   the second report includes one report selected form a group comprising a radio link failure (RLF) report, a random access channel (RACH) report, and a connection establishment failure (CEF) report.

6. The method of claim 1, wherein:
   the report includes a radio link failure (RLF) report; and
   the LBT information includes a radio link failure (RLF)-cause, a RLF type, a number of consistent LBT failure(s), a cell identify, an uplink (UL) transmission type, a number of bandwidth parts (BWPs), a BWP identifier for one or more BWPs, a BWP frequency for one or more BWPs, an interface type, or a combination thereof.

7. The method of claim 1, wherein:
   the report includes a random access channel (RACH) report; and
   the LBT information includes a number of LBT failure(s) detected prior to a RACH attempt, an indication of resource selection due to a LBT failure, a cell ID, a tracking area identity (TAI), an NR-U random access channel (RACH) report identifier, a new radio (NR) RACH report identifier, a RACH failure cause value for an LBT failure, or a combination thereof.

8. The method of claim 1, wherein:
   the report includes a connection establishment failure (CEF) report; and
   the LBT information includes a radio link failure (RLF)-cause, a RLF type, a number of consistent LBT failure(s), a BWP identifier for one or more BWPs, a BWP frequency for one or more BWPs, an interface type, a cell ID, an indication of UL LBT failure, an indication of DL LBT failure, or a combination thereof.

9. A method for wireless communication performed by a user equipment (UE), the method comprising:
   determining received signal strength indicator (RSSI) and channel occupancy information for new radio-unlicensed (NR-U) operation of the UE; and
   transmitting a report including the RSSI and channel occupancy information based at least in part on a NR-U frequency list for RSSI and channel occupancy logging, a NR-U cell ID list for RSSI and channel occupancy logging, a logging area of NR-U, a logging interval for RSSI and channel occupancy measurement, or a combination thereof.

10. The method of claim 9, wherein the UE is configured for NR-U operation during determining the RSSI and channel occupancy information.

11. The method of claim 9, wherein the report includes a logged minimization of drive test (MDT) report or an immediate minimization of drive test (MDT) report.

12. The method of claim 9, further comprising receiving, from a network entity, a configuration message to log the RSSI and channel occupancy information with logged minimization of drive test (MDT) information.

13. The method of claim 12, wherein the configuration message includes the NR-U frequency list for RSSI and channel occupancy logging, the NR-U cell ID list for RSSI and channel occupancy logging, the logging area of NR-U, the logging interval for RSSI and channel occupancy measurement, or a combination thereof.

14. The method of claim 9, further comprising:
   logging the RSSI and channel occupancy with logged MDT while the UE is in a non-active mode; and
   wherein the non-active mode include a RRC_IDLE mode or a RRC_INACTIVE mode; and
   wherein the RSSI and channel occupancy information includes a measurement result of RSSI and channel occupancy, an indicator of a channel occupancy status, an occupancy bandwidth, an NR-U frequency, a NR-U cell ID, a channel occupancy time, a time stamp, location information, or a combination thereof.

15. The method of claim 9, further comprising:
receiving, from a network entity, a configuration message to configure immediate MDT measurements for RSSI and channel occupancy; and
wherein the UE determines the immediate MDT measurements and the RSSI and channel occupancy information while the UE is in a radio resource control (RRC) connected mode; and
wherein the RSSI and channel occupancy information corresponds to location information of the UE.

16. A user equipment (UE) configured for wireless communication, the UE comprising:
at least one processor; and
a memory coupled to the at least one processor,
wherein the at least one processor is configured to:
determine listen before talk (LBT) information associated with new radio-unlicensed (NR-U) operation of the UE; and
initiate transmission of a report including the LBT information, wherein the LBT information includes a channel access scheme identifier indicating a channel access scheme of a plurality of channel access schemes.

17. The UE of claim 16, wherein:
the UE is configured for NR-U operation during determining the LBT information;
the LBT information includes LBT failure information; or
a combination thereof.

18. The UE of claim 16, wherein the LBT information includes a radio link failure (RLF)-cause, a RLF type, a number of consistent LBT failure(s), a cell identify, an uplink (UL) transmission type, a number of bandwidth parts (BWPs), a BWP identifier for one or more BWPs, a BWP frequency for one or more BWPs, an interface type, a number of LBT failure(s) detected prior to a RACH attempt, an indication of resource selection due to a LBT failure, a cell ID, a tracking area identity (TAI), an NR-U random access channel (RACH) report identifier, a new radio (NR) RACH report identifier, a RACH failure cause value for an LBT failure, an indication of UL LBT failure, an indication of DL LBT failure, or a combination thereof.

19. The UE of claim 16, wherein the report includes a radio link failure (RLF) report, a random access channel (RACH) report, or a connection establishment failure (CEF) report.

20. The UE of claim 16, wherein:
transmission of the report includes transmission of a first report and a second report;
the first report includes one report selected from a group comprising a radio link failure (RLF) report, a random access channel (RACH) report, and a connection establishment failure (CEF) report; and
the second report includes one report selected form a group comprising a radio link failure (RLF) report, a random access channel (RACH) report, and a connection establishment failure (CEF) report.

21. The UE of claim 16, wherein:
the report includes a radio link failure (RLF) report; and
the LBT information includes a radio link failure (RLF)-cause, a RLF type, a number of consistent LBT failure(s), a cell identify, an uplink (UL) transmission type, a number of bandwidth parts (BWPs), a BWP identifier for one or more BWPs, a BWP frequency for one or more BWPs, an interface type, or a combination thereof.

22. The UE of claim 16, wherein:
the report includes a random access channel (RACH) report; and
the LBT information includes a number of LBT failure(s) detected prior to a RACH attempt, an indication of resource selection due to a LBT failure, a cell ID, a tracking area identity (TAI), an NR-U random access channel (RACH) report identifier, a new radio (NR) RACH report identifier, a RACH failure cause value for an LBT failure, or a combination thereof.

23. The UE of claim 16, wherein:
the report includes a connection establishment failure (CEF) report; and
the LBT information includes a radio link failure (RLF)-cause, a RLF type, a number of consistent LBT failure(s), a BWP identifier for one or more BWPs, a BWP frequency for one or more BWPs, an interface type, a cell ID, an indication of UL LBT failure, an indication of DL LBT failure, or a combination thereof.

24. A user equipment (UE) configured for wireless communication, the UE comprising:
at least one processor; and
a memory coupled to the at least one processor,
wherein the at least one processor is configured to:
determine received signal strength indicator (RSSI) and channel occupancy information for new radio-unlicensed (NR-U) operation of the UE; and
initiate transmission of a report including the RSSI and channel occupancy information based at least in part on a NR-U frequency list for RSSI and channel occupancy logging, a NR-U cell ID list for RSSI and channel occupancy logging, a logging area of NR-U, a logging interval for RSSI and channel occupancy measurement, or a combination thereof.

25. The UE of claim 24, wherein:
the UE is configured for NR-U operation during determining the RSSI and channel occupancy information; or
the report includes a logged minimization of drive test (MDT) report or an immediate minimization of drive test (MDT) report.

26. The UE of claim 24, wherein the at least one processor is further configured to receive, from a network entity, a configuration message to log the RSSI and channel occupancy information with logged minimization of drive test (MDT) information.

27. The UE of claim 26, wherein the configuration message includes the NR-U frequency list for RSSI and channel occupancy logging, the NR-U cell ID list for RSSI and channel occupancy logging, the logging area of NR-U, the logging interval for RSSI and channel occupancy measurement, or a combination thereof.

28. The UE of claim 24, wherein the at least one processor is further configured to log the RSSI and channel occupancy with logged MDT while the UE is in a non-active mode; and
wherein the non-active mode include a RRC_IDLE mode or a RRC INACTIVE mode.

29. The UE of claim 24, wherein the RSSI and channel occupancy information includes a measurement result of RSSI and channel occupancy, an indicator of a channel occupancy status, an occupancy bandwidth, an NR-U frequency, a NR-U cell ID, a channel occupancy time, a time stamp, location information, or a combination thereof.

30. The UE of claim 24, wherein:
the at least one processor is further configured to receive, from a network entity, a configuration message to configure immediate MDT measurements for RSSI and channel occupancy; and
the UE determines the immediate MDT measurements and the RSSI and channel occupancy information while the UE is in a radio resource control (RRC) connected mode; or
the RSSI and channel occupancy information corresponds to location information of the UE.

31. An apparatus configured for wireless communication, the apparatus comprising:
at least one processor; and
a memory coupled to the at least one processor,
wherein the at least one processor is configured to:
  initiate transmission, by a network entity, of a configuration message to a user equipment (UE); and
  receive, from the UE, a report including received signal strength indicator (RSSI) and channel occupancy information for new radio-unlicensed (NR-U) operation of the UE based at least in part on a NR-U frequency list for RSSI and channel occupancy logging, a NR-U cell ID list for RSSI and channel occupancy logging, a logging area of NR-U, a logging interval for RSSI and channel occupancy measurement, or a combination thereof.

32. The apparatus of claim 31, wherein the report includes a logged minimization of drive test (MDT) report, an immediate MDT report, or a combination thereof.

33. The apparatus of claim 31, wherein the configuration message indicates to log the RSSI and channel occupancy information with logged minimization of drive test (MDT) information or to configure immediate MDT measurements for RSSI and channel occupancy.

34. The apparatus of claim 33, wherein the configuration message includes the NR-U frequency list for RSSI and channel occupancy logging, the NR-U cell ID list for RSSI and channel occupancy logging, the logging area of NR-U, the logging interval for RSSI and channel occupancy measurement, or a combination thereof.

35. The apparatus of claim 31, further comprising:
receiving an additional report; and
wherein the additional report includes listen before talk (LBT) information associated with the NR-U operation of the UE; and
wherein the additional report includes a radio link failure (RLF) report, a random access channel (RACH) report, or a connection establishment failure (CEF) report.

* * * * *